United States Patent
Miyahara

(10) Patent No.: US 9,563,255 B2
(45) Date of Patent: Feb. 7, 2017

(54) METHOD FOR TERMINATING OR POWERING A WIRELESS CONNECTION TO IMAGE PROCESSING APPARATUS BASED ON TYPE OF CONNECTION MODE

(71) Applicant: CANON KABUSHIKI KAISHA, Tokyo (JP)

(72) Inventor: Kazuya Miyahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 468 days.

(21) Appl. No.: 14/141,321

(22) Filed: Dec. 26, 2013

(65) Prior Publication Data
US 2014/0189396 A1 Jul. 3, 2014

(30) Foreign Application Priority Data
Dec. 28, 2012 (JP) .................................. 2012-286679

(51) Int. Cl.
G06F 13/00 (2006.01)
G06F 1/32 (2006.01)

(52) U.S. Cl.
CPC ............. *G06F 1/325* (2013.01); *G06F 1/3209* (2013.01)

(58) Field of Classification Search
CPC ............................. G06F 1/3209; G06F 1/325
USPC ........................................ 710/8–10; 358/1.15
See application file for complete search history.

(56) References Cited

U.S. PATENT DOCUMENTS

| | | | | |
|---|---|---|---|---|
| 7,324,226 B2* | 1/2008 | Fritz | ..................... | H04W 76/02 358/1.1 |
| 7,721,126 B2* | 5/2010 | Mashimo | .......... | H04L 29/12028 358/1.15 |
| 8,237,953 B2* | 8/2012 | Watanabe | ............. | G06F 3/1204 358/1.13 |
| 8,756,305 B2* | 6/2014 | Hirose | .................... | H04L 29/06 358/1.15 |
| 2006/0077455 A1* | 4/2006 | Watanabe | ............. | G06F 3/1204 358/1.15 |
| 2013/0138986 A1* | 5/2013 | Park | ................... | H04N 1/00885 713/320 |

FOREIGN PATENT DOCUMENTS

| | | |
|---|---|---|
| CN | 1933556 A | 3/2007 |
| CN | 101140694 A | 3/2008 |
| CN | 101594426 A | 12/2009 |
| CN | 102438221 A | 5/2012 |
| JP | 2009-44251 A | 2/2009 |
| WO | 2012/095918 A1 | 7/2012 |

* cited by examiner

*Primary Examiner* — Tammara Peyton
(74) *Attorney, Agent, or Firm* — Canon USA, Inc. IP Division

(57) ABSTRACT

A communication apparatus includes a connection unit configured to connect the communication apparatus to an external apparatus, a determination unit configured to determine whether the external apparatus is connected to the communication apparatus via the connection unit in a first connection mode, the first connection mode being a mode in which the external apparatus establishes a connection to a pre-registered apparatus, and a control unit configured to decide, based on a determination result obtained by the determination unit, whether to allow an operation for powering off the external apparatus to be performed.

23 Claims, 13 Drawing Sheets

METHOD FOR TERMINATING OR POWERING A WIRELESS CONNECTION TO IMAGE PROCESSING APPARATUS BASED ON TYPE OF CONNECTION MODE

BACKGROUND

Field

An aspect of the present invention generally relates to a communication apparatus and an information processing apparatus each configured to be connected to another apparatus and perform data transmission with the other apparatus.

Description of the Related Art

Recently, apparatuses have been developed which implement a content transfer system in which content is transmitted from an apparatus to another apparatus using a wireless communication function. For example, digital cameras having a wireless communication function and capable of wirelessly transmitting image data obtained by image capturing to an external apparatus are available. Such digital cameras are utilized, for example, in such a manner that image data stored in the digital cameras is disclosed to an external apparatus and image data that the user wishes to acquire is selected at the external apparatus side (Japanese Patent Laid-Open No. 2009-44251).

Various types of control may be performed for a digital camera from an external apparatus. Also, there may be various connection modes for connection between the external apparatus and the digital camera. Accordingly, the type of control is desirably decided while taking the connection mode into consideration.

SUMMARY

According to an aspect of the present invention, a communication apparatus is provided which includes a connection unit configured to connect the communication apparatus to an external apparatus, a determination unit configured to determine whether the external apparatus is connected to the communication apparatus via the connection unit in a first connection mode, the first connection mode being a mode in which the external apparatus establishes a connection to a pre-registered apparatus, and a control unit configured to decide, based on a determination result obtained by the determination unit, whether to allow an operation for powering off the external apparatus to be performed.

Further features of the present disclosure will become apparent from the following description of exemplary embodiments with reference to the attached drawings.

BRIEF DESCRIPTION OF THE DRAWINGS

FIGS. 5A-1 to 5B-2 each illustrate an example of a display screen displayed in the digital camera and the mobile phone during the connection process in the first embodiment.

DESCRIPTION OF THE EMBODIMENTS

First Embodiment

Configuration of Digital Camera

Figure 1:
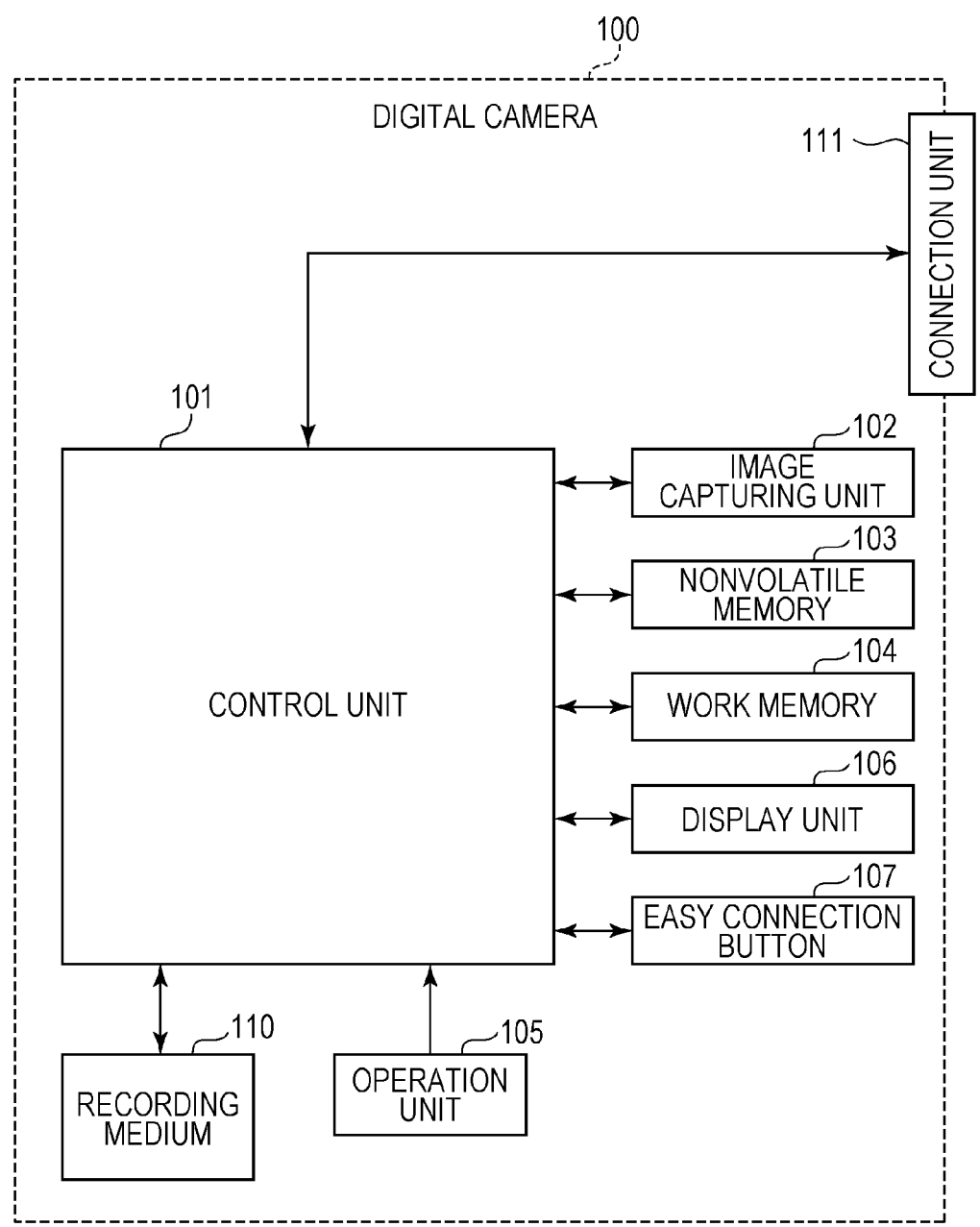
FIG. 1 is a block diagram illustrating the configuration of a digital camera according to a first embodiment.

FIG. 1 is a block diagram illustrating an example of the configuration of a digital camera 100, which is an example of a content transmission apparatus (information processing apparatus) included in a content transfer system according to a first embodiment. Note that a digital camera will be described as an example of the content transmission apparatus herein, but the content transmission apparatus is not limited to the digital camera. For example, the content transmission apparatus may be an information processing apparatus, such as a mobile phone, a tablet device, or a personal computer; or an image capturing apparatus, such as a camera-equipped mobile phone. Also, content to be transmitted is not limited to image data, and may be audio data or document data.

The digital camera 100 includes a control unit 101, an image capturing unit 102, a nonvolatile memory 103, a work memory 104, an operation unit 105, a display unit 106, an easy connection button 107, a recording medium 110, and a connection unit 111. The control unit 101 is configured to control each unit of the digital camera 100 in accordance with an input signal and a program described later. Note that in place of the control unit 101, multiple pieces of hardware may be configured to control the digital camera 100 in a distributed manner. The image capturing unit 102 is configured to convert an optical image of a subject formed by a lens included therein into an electrical signal, to perform processing such as noise reduction, and to output digital data as image data. The image data obtained by image capturing is buffered in a buffer memory, is then subjected to certain computation performed by the control unit 101, and is then recorded on the recording medium 110.

The nonvolatile memory 103 is an electrically erasable/recordable nonvolatile memory, and is configured to store a program (described later) to be executed by the control unit 101. The work memory 104 is used as, for example, a buffer memory that temporarily stores image data obtained by image capturing performed by the image capturing unit 102, an image display memory of the display unit 106, and a work area of the control unit 101.

The operation unit 105 is configured to accept, from the user, an instruction input to the digital camera 100 by the user. The operation unit 105 includes operation components, for example, a power button used by the user to input an instruction to power on or off the digital camera 100, a release switch used by the user to input an instruction to capture an image, and a playback button used by the user to input an instruction to play image data. The operation unit 105 also includes a touch panel arranged together with the display unit 106 (described later). The release switch includes sub-switches SW1 and SW2. The sub-switch SW1 is turned on when the release switch is pressed halfway. Upon the sub-switch SW1 being turned on, the control unit 101 performs preparation for image capturing, such as automatic focus (AF) adjustment processing, automatic exposure (AE) adjustment processing, automatic white balance (AWB) adjustment processing, and flash preliminary emission (EF) processing. When the release switch is fully pressed, the switch SW2 is turned on. The control unit 101 accepts turning on of the switch SW2 as an instruction to capture an image.

The display unit 106 is configured to display a viewfinder image during image capturing, image data obtained by image capturing, and a message used for an interactive operation, for example. Note that the digital camera 100 is not necessarily required to include the display unit 106. For example, the digital camera 100 may be connected to the display unit 106 and at least has a display control function used to control a display operation performed by the display unit 106.

The easy connection button 107 is an interface for establishing a connection between the digital camera 100 and an external apparatus in a simplified manner. By making a setting regarding a connection-target external apparatus in the digital camera 100, a connection may be established between the digital camera 100 and the specified external apparatus immediately after selection of the easy connection button 107. In the first embodiment, the easy connection button 107 is an operation component provided exclusively to accept an instruction to establish a connection to a specified external apparatus.

The recording medium 110 is configured to store image data output from the image capturing unit 102 thereon. The recording medium 110 may be removable from the digital camera 100 or built in the digital camera 100. That is, the digital camera 100 at least includes a configuration enabling access to the recording medium 110.

The connection unit 111 is an interface configured to connect the digital camera 100 to an external apparatus. The digital camera 100 according to the first embodiment is able to exchange data with an external apparatus via the connection unit 111. Note that in the first embodiment, the connection unit 111 is a wireless communication unit including an antenna, and the control unit 101 may be connected to an external apparatus via the antenna. The above is the description regarding the digital camera 100.

Configuration of Mobile Phone

Figure 2:
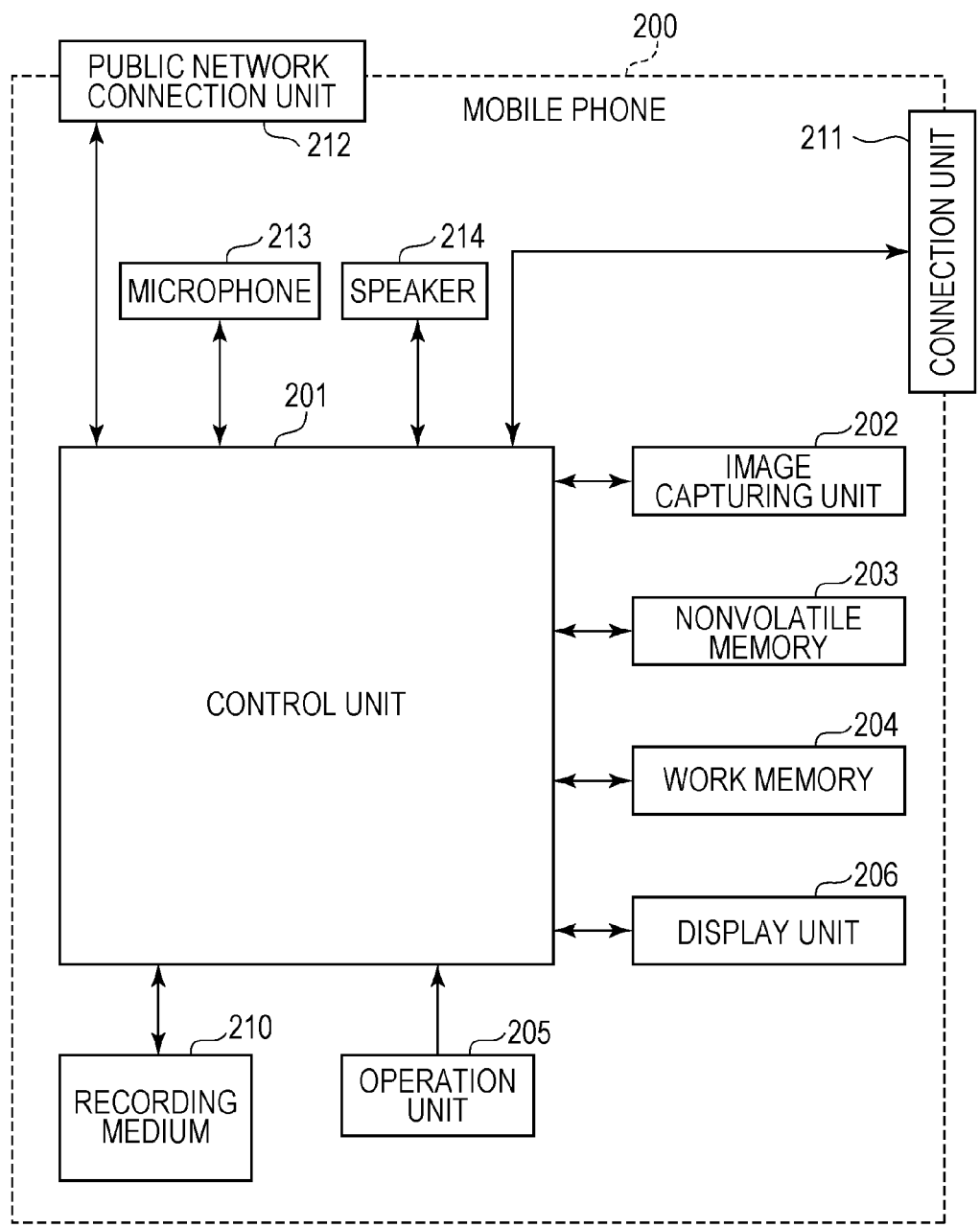
FIG. 2 is a block diagram illustrating the configuration of a mobile phone according to the first embodiment.

Next, a mobile phone 200, which is an example of a communication apparatus, will be described. FIG. 2 is a block diagram illustrating an example of the configuration of the mobile phone 200, which is an example of a communication apparatus configured to receive content from the content transmission apparatus in the first embodiment. Note that a mobile phone is described as an example of the communication apparatus herein, but the communication apparatus is not limited to the mobile phone. For example, various kinds of information processing apparatuses, such as a wireless-function-equipped digital camera, a tablet device, or a personal computer, may be used as the communication apparatus configured to receive content.

The mobile phone 200 includes a control unit 201, an image capturing unit 202, a nonvolatile memory 203, a work memory 204, an operation unit 205, a display unit 206, a recording medium 210, a connection unit 211, a public network connection unit 212, a microphone 213, and a speaker 214. The control unit 201 is configured to control each unit of the mobile phone 200 in accordance with an input signal and a program described later. Note that in place of the control unit 201, multiple pieces of hardware may be configured to control the mobile phone 200 in a distributed manner. The image capturing unit 202 is configured to convert an optical image of a subject formed by a lens included therein into an electrical signal, to perform processing such as noise reduction, and to output digital data as image data. The image data obtained by image capturing is buffered in a buffer memory, is then subjected to certain computation performed by the control unit 201, and is then recorded on the recording medium 210.

The nonvolatile memory 203 is an electrically erasable/recordable nonvolatile memory, and is configured to store a program (described later) to be executed by the control unit 201. The work memory 204 is used as an image display memory of the display unit 206 and a work area of the control unit 201, for example. The operation unit 205 is configured to accept, from the user, an instruction input to the mobile phone 200. The operation unit 205 includes operation components, for example, a power button used by the user to input an instruction to power on or off the mobile phone 200 and a touch panel arranged together with the display unit 206. The display unit 206 is configured to display image data and a message used for an interactive operation, for example. Note that the mobile phone 200 is not necessarily required to include the display unit 206. For example, the mobile phone 200 may be connected to the display unit 206 and at least has a display control function used to control a display operation of the display unit 206.

The recording medium 210 is configured to store image data output from the image capturing unit 202 thereon. The recording medium 210 may be removable from the mobile phone 200 or built in the mobile phone 200. That is, the mobile phone 200 at least includes a configuration enabling access to the recording medium 210. The connection unit 211 is an interface configured to connect the mobile phone 200 to an external apparatus. The mobile phone 200 according to the first embodiment is able to exchange data with the digital camera 100 via the connection unit 211. Note that in the first embodiment, the connection unit 211 is an antenna, and the control unit 201 may be connected to the digital camera 100 via the antenna.

The public network connection unit 212 is an interface used when wireless communication is performed via a public network. The mobile phone 200 is configured to establish a call to another apparatus via the public network connection unit 212. At this time, the control unit 201 implements a call by receiving and outputting audio signals via the microphone 213 and the speaker 214, respectively. In the first embodiment, the public network connection unit 212 includes an antenna, and the control unit 201 may be connected to a public network via the antenna. Note that the connection unit 211 and the public network connection unit 212 may share one antenna. The above is the description of the mobile phone 200.

Overview of Connection Configuration

Figure 3A:
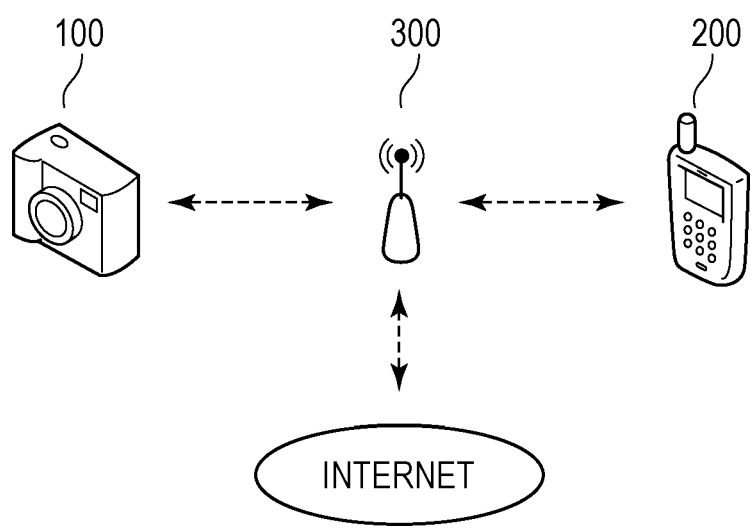
FIGS. 3A and 3B are diagrams illustrating network configurations according to the first embodiment.
Figure 3B:

FIGS. 3A and 3B are diagrams schematically illustrating connection configurations of connection between the digital camera 100 and the mobile phone 200. In the case where data is wirelessly transmitted and received between the digital camera 100 and the mobile phone 200, two connection configurations illustrated in FIGS. 3A and 3B may be used.

FIG. 3A illustrates a configuration in which the digital camera 100 and the mobile phone 200 participate in a wireless local area network (LAN) created by an external access point (AP) 300, which is an example of an external relay apparatus. The digital camera 100 and the mobile phone 200 each detect a beacon signal transmitted by the external AP 300 at regular intervals, and thereby participating in the wireless LAN created by the external AP 300. After participating in the same wireless LAN, the digital camera 100 and the mobile phone 200 discover each other and acquire the specs of each other. After such a process, the digital camera 100 and the mobile phone 200 become ready to transmit and receive data via the wireless LAN (a connection is established therebetween). In the first embodiment, the external AP 300 may be connected to an external network, such as the Internet, via a public network. This configuration thus enables the mobile phone 200 to transmit data over the Internet via the external AP 300.

FIG. 3B illustrates a configuration in which the digital camera 100 and the mobile phone 200 are connected to each other not via the external AP 300 but directly. In this case, the digital camera 100 is configured to operate as a simplified AP and to create a wireless LAN. After starting operating as a simplified AP, the digital camera 100 starts transmitting a beacon signal at regular intervals. The mobile phone 200 detects this beacon signal, and thereby participating in the wireless LAN created by the digital camera 100. Then, similarly to the case illustrated in FIG. 3A, the digital camera 100 and the mobile phone 200 discover each other and acquire the specs of each other so as to establish a connection, and consequently become ready to transmit and receive data.

In the above-described example, the digital camera 100 operates as a simplified AP as illustrated in FIG. 3B in the case of direct connection, but the configuration is not limited to this one. For example, the digital camera 100 and the mobile phone 200 may perform preliminary communication to dynamically decide which of the digital camera 100 and the mobile phone 200 is to operate as a simplified AP. As described above, there may be two connection configurations of connection between the digital camera 100 and the mobile phone 200.

Overview of Connection Processes

Next, a description will be given of processes performed when a connection is established between the digital camera 100 and the mobile phone 200 in the first embodiment. As described before, in the first embodiment, the digital camera 100 may be connected to the mobile phone 200 via the connection unit 111. Via this connection, image data recorded on the recording medium 110 of the digital camera 100 may be selected and transmitted to the mobile phone 200.

In the first embodiment, a connection between the digital camera 100 and the mobile phone 200 may be established in a first connection mode or a second connection mode. In the first connection mode, a certain operation is performed to establish a connection to an external apparatus. In the second connection mode, fewer operation steps are performed to establish a connection to a pre-registered external apparatus than in the first connection mode. The first embodiment employs two connection modes, that is, a normal connection mode serving as the first connection mode and an easy connection mode serving as the second connection mode. The normal connection mode is a connection mode in which the digital camera 100 establishes a connection to a given connectable mobile phone. In this mode, the user operates the operation unit 105 of the digital camera 100 so as to cause the display unit 106 to display a menu regarding wireless LANs thereon and then cause a connection to the mobile phone 200 to be established. In contrast, the easy connection mode is a connection mode in which a connection to one pre-registered mobile phone that is frequently connected to the digital camera 100 is established by performing fewer operation steps than in the normal connection mode. In the easy connection mode, a connection between the digital camera 100 and the mobile phone 200 may be established by simply pressing the easy connection button 107 from the viewpoint of the user. The first embodiment describes a configuration in which one mobile phone is registered for the easy connection mode, but the configuration is not limited to this one. For example, multiple easy connection buttons may be provided so as to allow multiple mobile phones to be registered for the respective buttons. In this way, a connection to each of the mobile phones may be established in the easy connection mode.

In the first embodiment, in the case where image data is transmitted from the digital camera 100 to the mobile phone 200 in the normal connection mode, the transmission process may be controlled using two methods, that is, by operating the digital camera 100 and by operating the mobile phone 200. In a first operation mode in which the transmission process is controlled by operating the digital camera 100, the following procedure is carried out. First, image data recorded on the recording medium 110 of the digital camera 100 is displayed on the display unit 106 of the digital camera 100. The user views the displayed image data, and operates the operation unit 105 to select image data to be transmitted and to input a transmission instruction. As a result of such an operation, the selected image data is transmitted from the digital camera 100 to the mobile phone 200.

In contrast, in a second operation mode in which the transmission process is controlled by operating the mobile phone 200, the mobile phone 200 first acquires image data (thumbnail(s)) recorded on the recording medium 110 from the digital camera 100, and displays the image data on the display unit 206 of the mobile phone 200. Then, the user views the displayed image data, and operates the operation unit 205 to select image data to be transmitted from the digital camera 100 and to transmit a transmission request to the digital camera 100. Upon receipt of this request, the digital camera 100 transmits the requested image data to the mobile phone 200. In the case where content is audio data or document data, for example, metadata such as titles or file names may be acquired and displayed.

In order to implement the image data transmission process in the first and second operation modes described above, the digital camera 100 and the mobile phone 200 according to the first embodiment each have two modes. The following describes these modes.

One of the operation modes of the digital camera 100 is a camera operation mode. In the camera operation mode, the user is able to control the transmission process by operating the digital camera 100. In the camera operation mode, the digital camera 100 is configured to display image data recorded on the recording medium 110 on the display unit 106 in a selectable manner. The user is able to select a displayed image using the operation unit 105. The user is also able to input an instruction to transmit, to the mobile phone 200, the selected image data using the operation unit 105. An operation mode of the mobile phone 200 corresponding to this camera operation mode of the digital camera 100 is an external apparatus standby mode. In the external apparatus standby mode, the mobile phone 200 may receive an image transmitted from the digital camera 100. In this mode, the user is unable to control the image data transmission process performed by the digital camera 100, by using the operation unit 205 of the mobile phone 200 (for example, unable to select an image to be transmitted from the digital camera 100 by operating the operation unit 205).

The other operation mode of the digital camera 100 is a camera standby mode. In the camera standby mode, the user is unable to control the image data transmission process to the mobile phone 200, by using the operation unit 105 of the digital camera 100. When the digital camera 100 is in this mode, the transmission process is controlled by operating the mobile phone 200. An operation mode of the mobile phone 200 for controlling the transmission process, corresponding to the camera standby mode, is called an external apparatus operation mode. In the external apparatus operation mode, the mobile phone 200 is configured to receive thumbnail(s) of image data recorded on the recording medium 110 from the digital camera 100, and displays the thumbnail(s) on the display unit 206 in a selectable manner. Consequently, the user is able to select an image to be transmitted, by using the mobile phone 200, while viewing the thumbnail(s) of the image data stored in the digital camera 100. The mobile phone 200 is configured to transmit, to the digital camera 100, a transmission request that causes the digital camera 100 to transmit the selected image data. The digital camera 100 that is in the camera standby mode transmits the image data to the mobile phone 200 in response to a transmission request received from the mobile phone 200 that is in the external apparatus operation mode.

As described above, the camera operation mode and the external apparatus standby mode correspond to the first operation modes of the digital camera 100 and the mobile phone 200, respectively. The camera standby mode and the external apparatus operation mode correspond to the second operation modes of the digital camera 100 and the mobile phone 200, respectively. Specifically, in the first operation mode in which the transmission process is controlled through operation of the digital camera 100, the transmission process is not controllable from the mobile phone 200. In contrast, in the second operation mode in which the transmission process is controlled through operation of the mobile phone 200, the transmission process is not controllable from the digital camera 100.

These operation modes may be switched between such that the corresponding pair of operation modes is maintained. For example, when the mode of the mobile phone 200 is switched from the external apparatus standby mode into the external apparatus operation mode, the mode of the digital camera 100 is also switched from the camera operation mode into the camera standby mode. In the first embodiment, at the start-up, the digital camera 100 is started in the camera operation mode and the mobile phone 200 is started in the external apparatus standby mode. In order for the mobile phone 200 to enter the external apparatus operation mode, permission from the digital camera 100 is needed. This is because when the digital camera 100 owned by a first person is connected to the mobile phone 200 owned by a second person, the first person may be unwilling to disclose image data to the second person. Accordingly, in the first embodiment, when the digital camera 100 is connected to the mobile phone 200, or in a certain setup menu, the digital camera 100 allows the user to select whether to permit disclosure of image data through a user operation. Whether the mobile phone 200 is permitted to enter the external apparatus operation mode is decided on the basis of the selection regarding this disclosure permission. Note that this setting regarding disclosure may include conditions for disclosing image data in addition to whether to permit disclosure. For example, a setting may be made such that pre-selected image data, image data including a specific subject, image data recorded in a specific recording format, and image data attached with a specific rating (of favorites) are to be disclosed.

The selected result as to whether to permit disclosure of image data may be recorded on the nonvolatile memory 103 of the digital camera 100. Whether to permit disclosure of image data may be automatically decided at the time of the subsequent connection attempts. In this way, whether to permit disclosure of image data may be decided without requiring any user operation at the time of the second and subsequent connection attempts. Alternatively, whether to permit disclosure of image data may be recorded on the nonvolatile memory 103 in association with the ID of a communication destination, so that whether to permit disclosure of image data may be decided based on a connected mobile phone (this will be described in relation to a connection history later). When the digital camera 100 is connected to a mobile phone, whether the ID of the mobile phone is registered is determined. If the ID is not registered, the user is prompted to select whether to permit disclosure of image data.

In the case where image data stored in the digital camera 100 is transmitted to the mobile phone 200 in the easy connection mode, the transmission of the image data may be controlled by operating the mobile phone 200. In this case, the digital camera 100 is in the camera standby mode and the mobile phone 200 is in the external apparatus operation mode or external apparatus standby mode. The digital camera 100 is configured not to enter the camera operation mode. This is because the easy connection mode is a mode in which the digital camera 100 is connected to a specified connection destination, such as the mobile phone 200 owned by the same person as the digital camera 100. Also, the easy connection mode only permits connection to the specific connection destination. Thus, in the case of connection in the easy connection mode, disclosure of image data is preferably permitted in general without making any inquiry as to whether to permit disclosure of image data to the user.

Connection Processes

Figure 4:
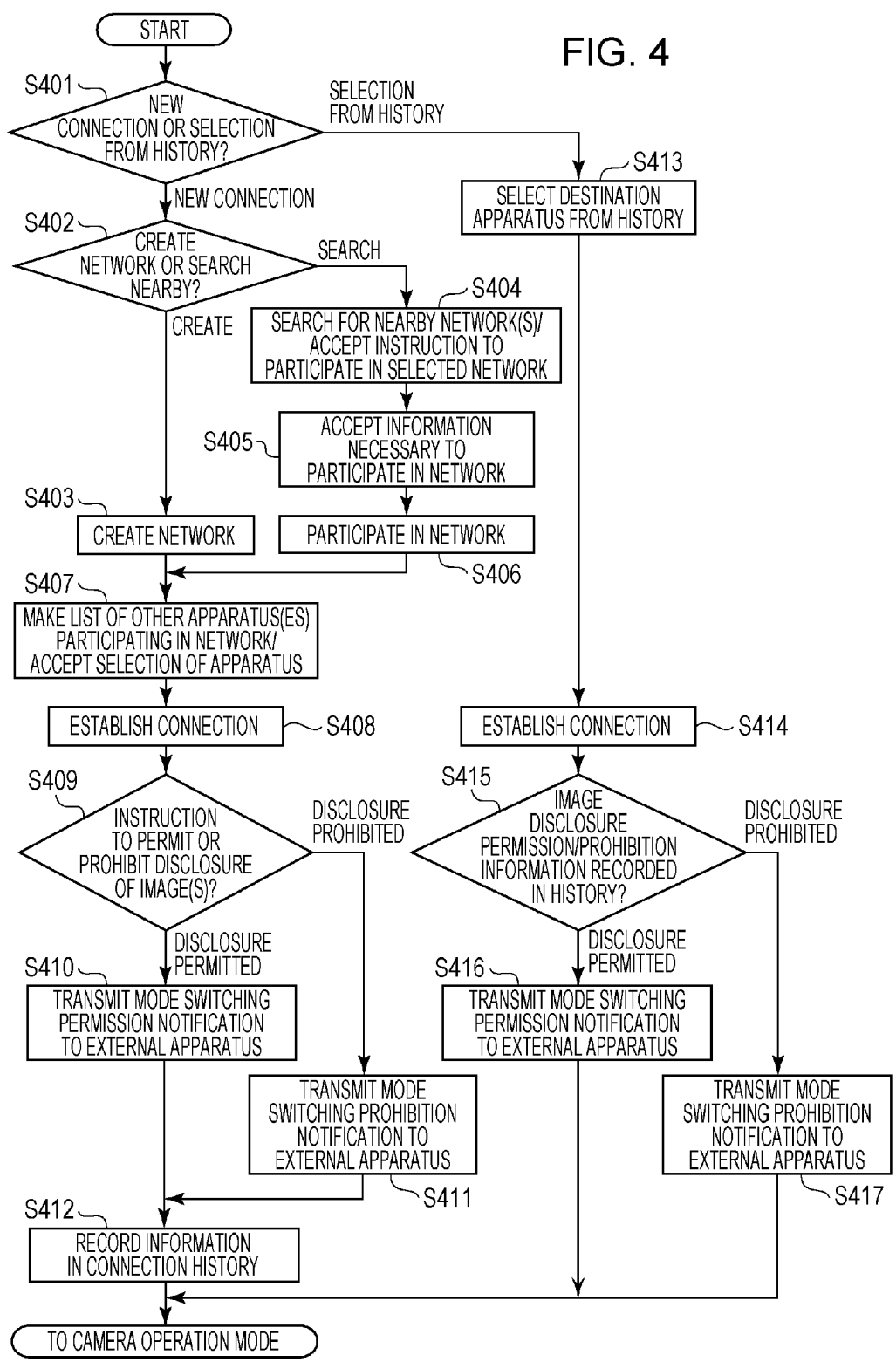
FIG. 4 is a flowchart illustrating a connection process performed by the digital camera in a normal connection mode in the first embodiment.

FIG. 4 is a flowchart illustrating an operation performed by the digital camera 100 when a connection is established between the digital camera 100 and the mobile phone 200 in the normal connection mode. Each processing step illustrated in this flowchart is implemented as a result of the control unit 101 of the digital camera 100 executing a program recorded on the nonvolatile memory 103 and controlling each unit of the digital camera 100 in accordance with the program. The same applies to flowcharts illustrating processes executed later by the digital camera 100. Also, the process illustrated in this flowchart starts when "Mobile phone" is selected on a screen illustrated in FIG. 5A-1 on which a type of the connection destination apparatus is selected.

First, in step S401, the control unit 101 accepts an instruction to search for a new connection-target apparatus or an instruction to establish a connection to an apparatus that has been connected to the digital camera 100 before. In processing of this step, the control unit 101 displays, for example, a screen illustrated in FIG. 5A-2 on the display unit 106. This screen shows a "new connection" button 501 that accepts an instruction to search for a new connection-target apparatus and a "select from history" button 502 that accepts an instruction to establish a connection to an apparatus that has been connected to the digital camera 100 before. The user is able to input the instruction to search for a new connection-target apparatus by selecting the "new connection" button 501 using the operation unit 105. Alternatively, the user is able to input the instruction to establish a connection to an apparatus that has been connected to the digital camera 100 before by selecting the "select from history" button 502 using the operation unit 105.

The following describes the case where the control unit 101 determines that the instruction to search for a new connection-target apparatus has been accepted in step S401. In this case, the process proceeds to step S402. In step S402, the control unit 101 displays a screen illustrated in FIG. 5A-3 on the display unit 106. This screen shows two buttons. One of the two buttons is a "Use camera as AP" button 511 used to cause the digital camera 100 to serve as an access point (AP) and to cause the mobile phone 200 to establish a connection directly to the digital camera 100. The other button is a "Search for AP" button 512 used to search for a network created by a nearby AP and to cause the mobile phone 200 to be connected to the network so as to establish a connection to the digital camera 100 via the AP.

Figures 1, 5A:
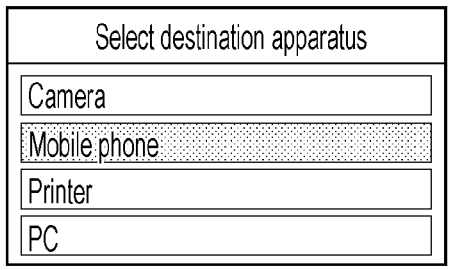
Figures 5, 5A:
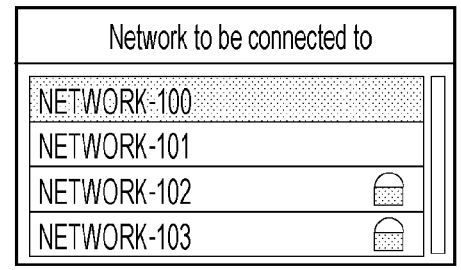
Figures 2, 5A:
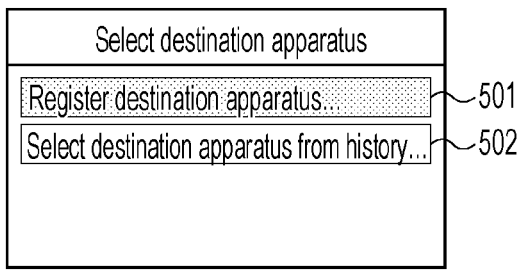
Figures 5, 5A, 6:
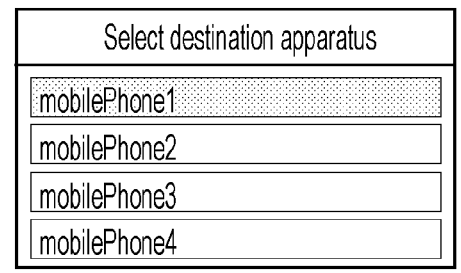
Figures 3, 5A:
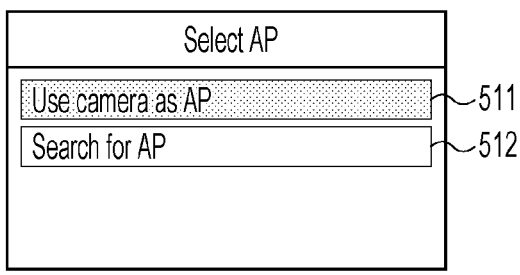
Figures 5, 5A, 6, 7:
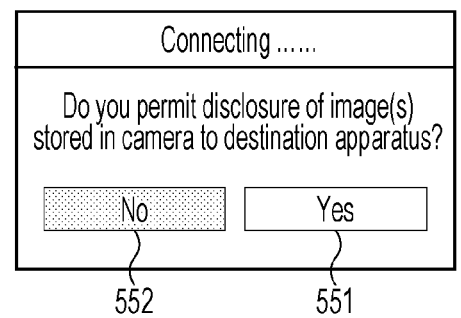
Figures 4, 5A:

If the "Use camera as AP" button 511 is selected on the screen illustrated in FIG. 5A-3 (if creation of a network is selected), the process proceeds to step S403. In step S403, the control unit 101 of the digital camera 100 starts an AP function and creates a network. At this time, a screen illustrated in FIG. 5A-4 is displayed on the display unit 106 and the digital camera 100 waits for a connection to be established from the mobile phone 200.

If the "Search for AP" button 512 is selected in step S402, the process proceeds to step S404. In step S404, the control unit 101 detects networks created by nearby APs of the digital camera 100 and makes a list of the networks. In addition, the control unit 101 accepts an instruction to participate in one of the detected networks. For example, the control unit 101 displays a screen illustrated in FIG. 5A-5 on the display unit 106. This screen lists extended service set identifiers (ESSIDs) of four detected networks, which are "NETWORK-100", "NETWORK-101", "NETWORK-102", and "NETWORK-103". The user is able to select these ESSIDs by using the operation unit 105. In response to selection of one of these ESSIDs, the control unit 101 accepts the instruction to participate in a network corresponding to the selected ESSID.

In step S405, the control unit 101 accepts input of information necessary to participate in the selected network. For example, the control unit 101 accepts input of information, such as an encryption key, an IP address acquisition method, and a domain name system (DNS) server setting. The user is able to input these pieces of information by using the operation unit 105. In step S406, the control unit 101 participates in the network by using the information accepted in step S405.

In step S407, the control unit 101 detects other participant apparatuses of the network, makes a list of the detected apparatuses, and accepts an instruction to select a connection-target apparatus. More specifically, the digital camera 100 transmits information for search, and receives information that is returned as a response by another apparatus having received the information. In this way, the digital camera 100 detects other participant apparatuses of the network. The information returned as a response by another apparatus includes information, such as the name and type of the apparatus. The control unit 101 refers to the name of the apparatus included in this information and displays, for example, a screen illustrated in FIG. 5A-6 on the display unit 106. At this time, possible destination apparatuses of content transmission may be preferably displayed in a selectable manner. The screen illustrated in FIG. 5A-6 lists the names of the detected apparatuses ("mobilePhone1" to "mobilePhone4"). In the first embodiment, the control unit 101 performs filtering on the responses received from the other apparatuses in terms of the apparatus type and displays names of only mobile phones. Accordingly, in this example, if apparatuses other than mobile phones are participating in the network, the names of these apparatuses are not displayed. The user is able to select a given name from the listed names of the apparatuses by using the operation unit 105. In response to selection of the name, the control unit 101 accepts an instruction to establish a connection to an apparatus having the selected name.

Upon receipt of the instruction to establish a connection to the apparatus having the selected name in step S407, the control unit 101 establishes a connection to the apparatus having the selected name in step S408. For example, in the case where the name corresponding to the mobile phone 200 is selected, the control unit 101 transmits a connection request to the mobile phone 200 via the connection unit 111 and then receives a connection permission signal transmitted from the mobile phone 200 in response to this connection request. In this way, a connection to the mobile phone 200, which is an external apparatus, is established.

In step S409, the control unit 101 accepts an instruction to permit or prohibit disclosure of image data recorded on the recording medium 110. More specifically, the control unit 101 displays a screen illustrated in FIG. 5A-7 on the display unit 106. In the example illustrated in FIG. 5A-7, a message "Do you permit disclosure of image(s) stored in camera to destination apparatus?" is displayed so as to prompt the user to input an instruction to permit or prohibit disclosure of image data. The user is able to input the instruction by selecting, using the operation unit 105, a "Yes" button 551 or "No" button 552 displayed on the screen along with the message.

If the control unit 101 determines that the "Yes" button 551 has been selected, the control unit 101 determines that an instruction to permit disclosure of image data has been accepted. In this case, viewing image data recorded on the recording medium 110 of the digital camera 100 from the mobile phone 200 is permitted. In other words, the mobile phone 200 is permitted to enter the external apparatus operation mode. As a result, the user of the mobile phone 200 is able to input, using the operation unit 205, a transmission request for an image that the user wishes to acquire from the digital camera 100, while viewing the image data recorded on the recording medium 110 of the digital camera 100.

If the control unit 101 determines that the "No" button 552 has been selected, the control unit 101 determines that an instruction to prohibit disclosure of image data has been accepted. In this case, viewing image data recorded on the recording medium 110 of the digital camera 100 from the mobile phone 200 is prohibited. In other words, the mobile phone 200 is prohibited from entering the external apparatus operation mode.

If the control unit 101 determines in step S409 that an instruction to permit disclosure of image data has been accepted, the process proceeds to step S410. In step S410, the control unit 101 transmits a mode switch permission notification to the corresponding external apparatus (the mobile phone 200 in this example). Upon receipt of this notification, the external apparatus (the mobile phone 200 in this example) becomes able to accept an instruction to enter the external apparatus operation mode from the external apparatus standby mode. That is, the mobile phone 200 is able to enter the external apparatus operation mode in response to an operation performed on the mobile phone 200. In other words, image data to be transmitted to the mobile phone 200 may be selected from image data recorded on the recording medium 110 of the digital camera 100, through an operation performed on the mobile phone 200. A process performed by the mobile phone 200 will be described later. As a result of the processing of step S410, the digital camera 100 is able to accept an image transmission instruction from the mobile phone 200. The process then proceeds to step S412.

If the control unit 101 determines in step S409 that an instruction to prohibit disclosure of image data has been accepted, the process proceeds to step S411. In step S411, the control unit 101 transmits a mode switch prohibition notification to the corresponding external apparatus (the mobile phone 200 in this example). Upon receipt of this notification, the external apparatus (the mobile phone 200 in this example) becomes unable to accept an instruction to enter the external apparatus operation mode from the external apparatus standby mode. That is, the mobile phone 200 is not able to enter the external apparatus operation mode in response to an operation performed on the mobile phone 200 alone. In other words, image data to be transmitted to the mobile phone 200 are made unselectable from image data recorded on the recording medium 110 of the digital camera 100, through an operation performed on the mobile phone 200. A process performed by the mobile phone 200 will be described later. As a result of the processing of step S411, the digital camera 100 is configured not to accept an image transmission instruction from the mobile phone 200. The process then proceeds to step S412.

In step S412, the control unit 101 records, in a connection history, information indicating whether to permit disclosure of image data and information indicating the normal connection mode, on the basis of the instruction accepted in step S409. Now, the connection history will be described in detail.

The connection history is a database that holds, for each external apparatus, information used to establish a connection to the external apparatus, and is recorded on the nonvolatile memory 103. In the first embodiment, in the case where a connection is re-established to an external apparatus that has been connected to the digital camera 100 before, the control unit 101 is able to establish a connection to the external apparatus by referring to the connection history without requiring the user to re-input information necessary for the connection (S413). The connection history includes information used to establish a connection to the external apparatus, such as the connection history number, the ESSID, the basic service set identifier (BSSID), the authentication scheme, the encryption type, the encryption key, the channel, the IP address acquisition method, the DNS acquisition method, the connected apparatus type, the name of the connected apparatus, the universally unique identifier (UUID), viewing permission information, and connection mode information. For example, if the control unit 101 determines in step S409 that an instruction to prohibit disclosure of image data has been accepted, information indicating "prohibited" is recorded as the viewing permission information in the connection history. The viewing permission information recorded at this time is used when a connection is re-established to the external apparatus. An overview of this database will be described later with reference to FIG. 8.

After the processing of step S412 ends, the digital camera 100 enters the camera operation mode. The above is the description of the case where the control unit 101 determines in step S401 that an instruction to search for a new connection-target apparatus has been accepted.

Now, a description will be given of the case where the control unit 101 determines in step S401 that an instruction to establish a connection to an apparatus that has been connected to the digital camera 100 before (instruction for selection from the history) has been accepted. In this case, the process proceeds to step S413.

In step S413, the control unit 101 accepts, from the user, an instruction to select a connection-target apparatus from apparatuses that have been connected to the digital camera 100 before. Specifically, the control unit 101 refers to the connection history, and displays a screen illustrated in FIG. 5A-8 on the display unit 106. This screen shows the names of external apparatuses that have been connected to the digital camera 100 before, included in the connection history. Here, the control unit 101 refers to the "connected apparatus type" among the aforementioned information of the connection history, and performs filtering to extract apparatuses whose names are to be displayed on the display unit 106 from the information of the connection history. In the first embodiment, mobile phones are selected based on the "connected apparatus type". Thus, names of apparatuses whose "connected apparatus type" of the connection history indicates the "mobile phone" are displayed as illustrated in FIG. 5A-8.

In step S414, the control unit 101 establishes a connection to the selected external apparatus on the basis of the instruction accepted from the user in step S413 and the information included in the connection history. In this step, the control unit 101 automatically participates in the network by using information necessary for participating in the network, such as the ESSID included in the connection history, automatically searches for the selected connection-target apparatus on the basis of UUID within the network, and automatically establishes a connection to the connection-target apparatus. In this way, the user's work for inputting information necessary for establishing a connection, such as the ESSID and selection of a network, may be omitted.

After a connection is established in step S414, the control unit 101 determines in step S415 whether permission to view image data has been given to the selected external apparatus before by referring to the viewing permission information included in the connection history of the selected external apparatus (mobile phone 200). If the control unit 101 determines that permission to view image data has been given to the selected external device before, the process proceeds to step S416. In step S416, processing similar to that performed in step S410 is performed. If the control unit 101 determines that permission to view image data has not been given to the selected external apparatus before, the process proceeds to step S417. In step S417, processing similar to that performed in step S411 is performed. As described above, in the case where the digital camera 100 is re-connected to an external apparatus that has been connected to the digital camera 100 before, whether to permit disclosure of image data is automatically selected without requiring the user's selection. In this way, the user's work for inputting view permission may be omitted at the time of re-connection. Thereafter, the process of this flowchart ends, and the digital camera 100 enters the camera operation mode.

Note that there may be provided a user interface or screen which permits the viewing permission information registered in the connection history to be edited (for example, modified to the permitted or prohibited state for each external apparatus). The flowchart does not include a step in which the digital camera 100 notifies the mobile phone 200 that the connection mode is the normal connection mode. However, for example, after a connection is established between the digital camera 100 and the mobile phone 200 in step S408 or S414, the digital camera 100 may notify the mobile phone 200 that a connection has been established in the normal connection mode. The above is the description of the operation performed when a connection is established between the digital camera 100 and the mobile phone 200.

FIG. 6 is a flowchart illustrating an operation performed by the digital camera 100 when a connection is established between the digital camera 100 and the mobile phone 200 in the easy connection mode. The process illustrated in this flowchart starts in response to pressing of the easy connection button 107 of the digital camera 100.

First, in step S601, the control unit 101 refers to the connection history and determines whether the connection history includes a record having the connection mode information indicating the easy connection mode. If no record having the connection mode information indicating the easy connection mode is found, the process proceeds to step S602, in which a new record is registered. If a record having the connection mode information indicating the easy connection mode is found, the process proceeds to step S611, in which the control unit 101 starts establishing a connection to the apparatus indicated by the found record.

First, a description will be given of the case where no record having the connection mode information indicating the easy connection mode is found. In this case, the process proceeds to step S602. In steps S602 to S608, the control unit 101 performs processing similar to that performed in steps S402 to S408 illustrated in FIG. 4 so as to set a network and establish a connection to the external apparatus.

In step S609, the control unit 101 transmits an easy connection mode notification to the mobile phone 200. Upon receipt of this notification, the mobile phone 200 becomes able to select image data to be transmitted to the mobile phone 200 from among image data recorded on the recording medium 110 of the digital camera 100, in response to an operation performed on the mobile phone 200. Also, in the easy connection mode, the mobile phone 200 is prohibited from entering the external apparatus standby mode in which image data is transmitted to the mobile phone 200 in response to an operation performed on the digital camera 100. A process performed by the mobile phone 200 will be described later. Thereafter, the process proceeds to step S610.

In step S610, the control unit 101 records connection information including information indicating the easy connection mode in the connection history. The above is the description of the case where no record having the connection mode information indicating the easy connection mode is found. Next, a description will be given of the case where a record having the connection mode information indicating the easy connection mode is found in step S601. In this case, the process proceeds to step S611.

In step S611, the control unit 101 establishes a connection on the basis of the information included in the connection history. Here, the control unit 101 automatically participates in or creates a network, by using information necessary for participating in or creating the network, such as ESSID included in the connection history. Further, the control unit 101 automatically searches for the selected connection-target apparatus on the basis of the UUID within the network, and establishes a connection thereto. In this way, the user's work for inputting information necessary for establishing a connection, such as ESSID or selection of a network, may be omitted.

After a connection is established in step S611, the control unit 101 transmits the easy connection mode notification to the mobile phone 200 in step S612 as in step S609. In the first embodiment, a notification of the easy connection mode is made in steps S609 and S612; however, this notification is not necessarily required to be made in the case where the operation content is not changed in the mobile phone 200. The above is the operation performed by the digital camera 100 when a connection is established between the digital camera 100 and the mobile phone 200 in the easy connection mode.

According to the above-described first embodiment, in the normal connection mode, the user of the digital camera 100 is able to restrict disclosure of image data in the case where the user is unwilling to disclose image data to other people, for example. In the easy connection mode, the work for setting whether to permit disclosure of image data may be omitted and a connection may be established to the mobile phone 200 by performing fewer operations. The following further describes a connection process performed by the mobile phone 200 and the connection history held in the digital camera 100.

Figure 7A:
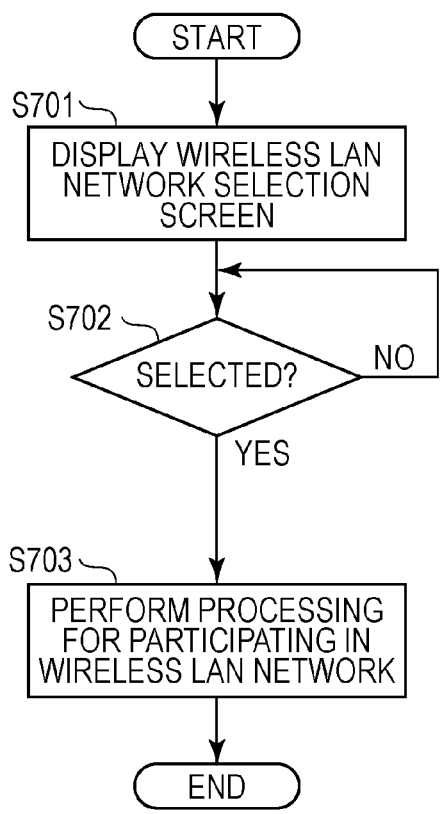
FIGS. 7A and 7B are flowcharts illustrating connection processes performed by the mobile phone in the first embodiment.
Figure 7B:
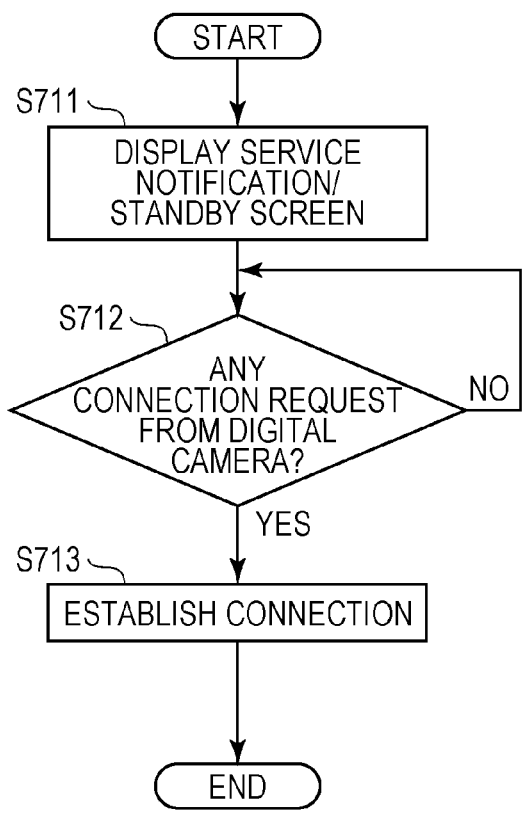
Figure 8:
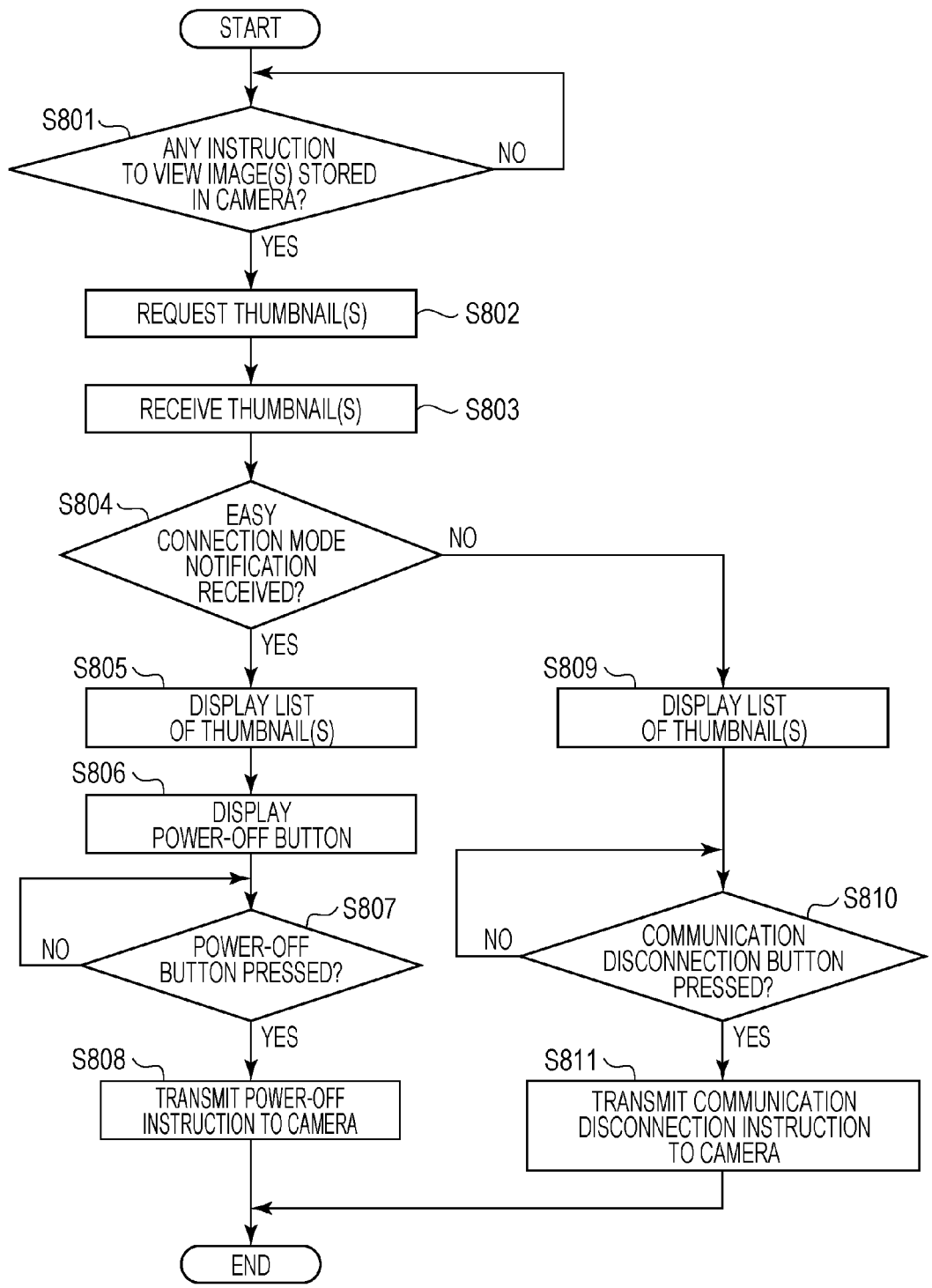
FIG. 8 is a flowchart illustrating a process performed based on a camera communication application of the mobile phone after a connection has been established in the first embodiment.

FIGS. 7A and 7B are flowcharts illustrating processes performed by the mobile phone 200 according to the first embodiment. The processes illustrated in these flowcharts are implemented as a result of the control unit 201 of the mobile phone 200 controlling each unit of the mobile phone 200 in accordance with an input signal and a program. The same applies to other flowcharts illustrating processes performed by the mobile phone 200 unless otherwise noted.

In response to a certain operation performed on the mobile phone 200 by the user, the control unit 201 displays on the display unit 206 a screen, which permits selection of a wireless LAN to which the mobile phone 200 participates in, in step S701. After the displayed screen is changed to this screen, the control unit 201 performs scanning to detect nearby wireless LANs and displays a list of ESSIDs detected as a result of scanning. FIG. 5B-1 illustrates an example of such a screen. In the first embodiment, this processing is performed by a function of the operating system (OS) of the mobile phone 200 before a camera communication application is started; however, the camera communication application that has been started in advance may perform the processing in cooperation with the function of the OS. In the case where the digital camera 100 is operating as a simplified AP, the mobile phone 200 detects the ESSID of the digital camera 100 and displays the ESSID in the list. FIG. 5B-1 illustrates the ESSID "CAMERA-123" of the digital camera 100.

In step S702, the control unit 201 waits for selection of one of the listed ESSIDs. When one of the listed ESSIDs is selected by a user operation, the control unit 201 performs processing for participating in a corresponding wireless LAN in step S703. In this way, participation in the network is completed.

After participation in the network has been completed, the user of the mobile phone 200 starts the camera communication application installed in the mobile phone 200. Referring to a flowchart illustrated in FIG. 7B, a process performed by the mobile phone 200 after the camera communication application is started will be described. Main functions of the camera communication application include a function for establishing a connection with a digital camera residing in the same network, a function of transmitting and receiving content data, such as image data, and a function of controlling a process of transmitting content data held in the mobile phone 200 to a server.

After the camera communication application is started in response to a user operation, a standby screen illustrated in FIG. 5B-2 is displayed on the display unit 206 in step S711. A dialog shows a service set identifier (SSID) of the network in which the mobile phone 200 is participating. FIG. 5B-2 illustrates an example screen displayed in step S711 when "CAMERA-123" is selected on the screen illustrated in FIG. 5B-1. After the camera communication application is started, the mobile phone 200 also makes a notification about services of thereof via the wireless LAN so as to allow the digital camera 100 to detect the mobile phone 200. Based on this service notification, the digital camera 100 is able to detect the mobile phone 200. Note that this service notification includes the device name and UUID of the mobile phone 200.

In step S712, the control unit 201 waits for a connection request from the digital camera 100. If the control unit 201 determines that a connection request has been made, the control unit 201 establishes a connection to the digital camera 100 in step S713. The above is the operation performed by the mobile phone 200 when a connection is established between the digital camera 100 and the mobile phone 200.

Figures 5, 5A, 6, 7, 8:
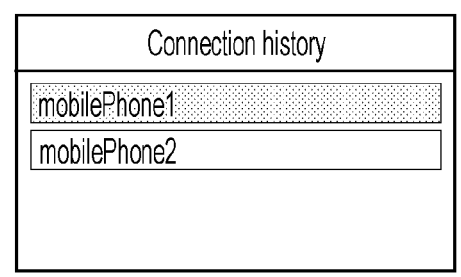
Figures 1, 5B:
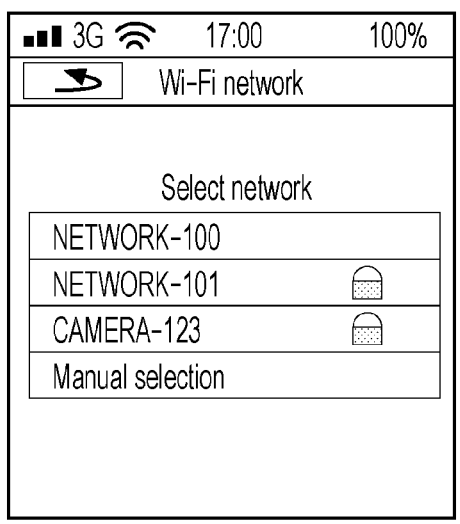
Figures 2, 5B:
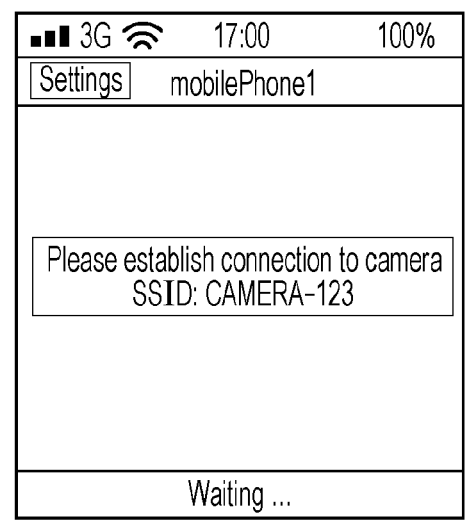
Figure 6:
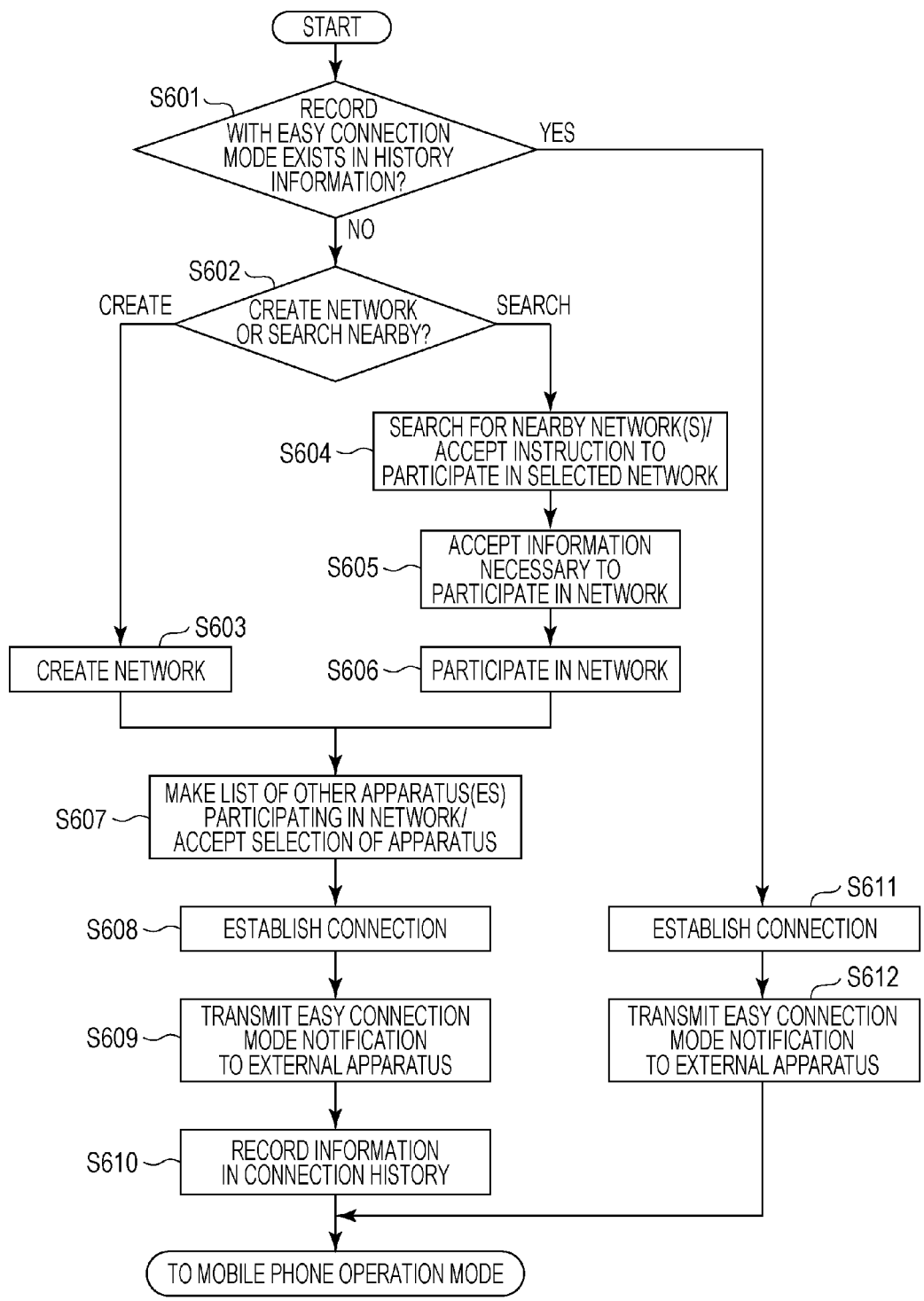
FIG. 6 is a flowchart illustrating a connection process performed by the digital camera in an easy connection mode in the first embodiment.

FIG. 8 is a flowchart illustrating a process performed by the mobile phone 200 using the camera communication application in the first embodiment. Two flows for the cases where a connection has been established in the normal connection mode and in the easy connection mode will be described herein.

Figure 11A:
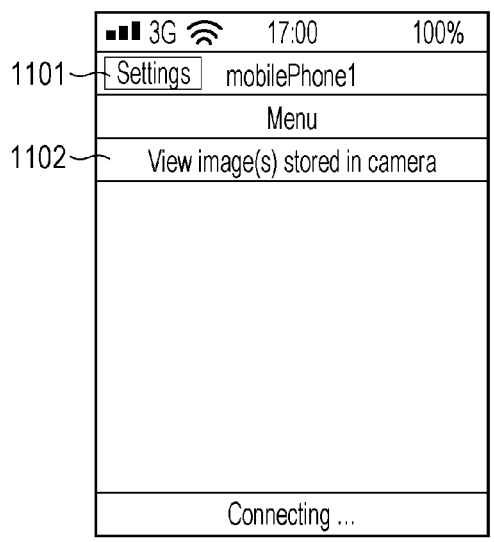
FIGS. 11A to 11D each illustrate an example of a display screen displayed in the mobile phone after a connection has been established in the first embodiment.

After a connection to the digital camera 100 has been established, the control unit 201 of the mobile phone 200 displays a menu screen of the camera communication application illustrated in FIG. 11A on the display unit 206. The menu screen shows a "Settings" button 1101 and a "View" button 1102. The "Settings" button 1101 is a button used to make various upload settings, such as a setting of the device name of the mobile phone 200. The "View" button 1102 is a button used to display image data stored in the digital camera 100 to which a connection has been established, on the display unit 206.

In step S801, the control unit 201 determines whether the "View" button 1102 has been selected. If the control unit 201 determines that the "View" button 1102 has been selected, the process proceeds to step S802. If not, the control unit 201 repeats processing of this step.

In step S802, the control unit 201 requests the digital camera 100 to transmit thumbnail(s) of image data stored in the digital camera 100. In response to this request, the digital camera 100 transmits the requested thumbnail(s) to the mobile phone 200. Note that a request for one thumbnail may be repeatedly transmitted or a request for multiple thumbnails may be transmitted.

In step S803, the mobile phone 200 receives, via the connection unit 211, the thumbnail(s) transmitted from the digital camera 100.

In step S804, the control unit 201 determines whether the easy connection mode notification has been received from the digital camera 100. If the control unit 201 determines that the easy connection mode notification has been received, the process proceeds to step S805. If not, the process proceeds to step S809.

First, a description will be given of the case where the control unit 201 determines in step S804 that the easy connection mode notification has not been received (a connection has been established in the normal connection mode). In this case, the process proceeds to step S809.

Figure 11B:
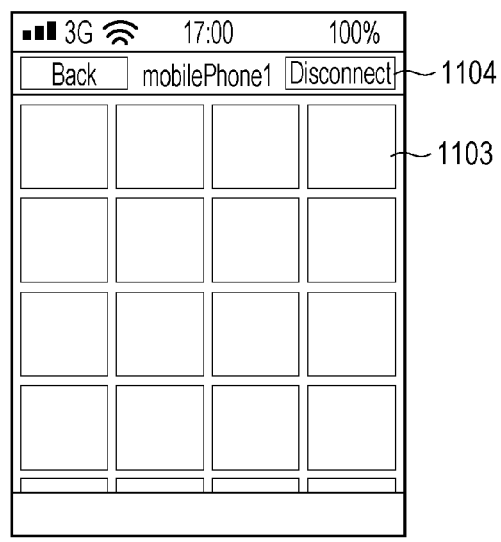

In step S809, the control unit 201 displays a list of the received thumbnail(s) and a "Disconnect" button 1104 on the display unit 206. FIG. 11B illustrates an example of the displayed screen. In the example of FIG. 11B, thumbnails 1103 are displayed in four columns and thumbnails of other image data may be displayed by performing an up-down scroll operation. In step S809, the "Disconnect" button 1104 is used to transmit, to the digital camera 100, an instruction to disconnect the mobile phone 200 from the digital camera 100. If the "Disconnect" button 1104 is selected, the mobile phone 200 is disconnected from the digital camera 100. Further, the mobile phone 200 may be disconnected from the network in which the mobile phone 200 is participating. Note that the "Disconnect" button 1104 is changed to a button for an instruction for another process, depending on the connection mode in which a connection is established to the digital camera 100. This will be described later.

In step S810, the control unit 201 determines whether the "Disconnect" button 1104 has been pressed. If the control unit 201 determines that the "Disconnect" button 1104 has been pressed, the process proceeds to step S811. If not, the processing of this step is repeated.

In step S811, the control unit 201 transmits a disconnection instruction to the digital camera 100. The above is the description of the case where it is determined in step S804 that the easy connection mode notification has not been received.

Next, a description will be given of the case where it is determined in step S804 that the easy connection mode notification has been received. In this case, the process proceeds to step S805.

Figure 11C:
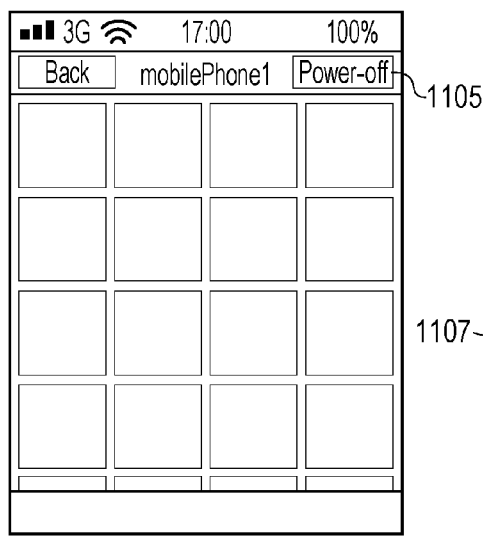

In step S805, the control unit 201 displays a list of the received thumbnail(s) on the display unit 206. In step S806, the control unit 201 displays a "Power-off" button 1105. FIG. 11C illustrates an example of the displayed screen. The "Power-off" button 1105 is used to transmit a power-off instruction to the digital camera 100. In the first embodiment, the "Power-off" button 1105 is displayed in place of the "Disconnect" button 1104 illustrated in FIG. 11B; however, both the "Disconnect" button 1104 and the "Power-off" button 1105 may be displayed on the same screen.

In step S807, the control unit 201 determines whether the "Power-off" button 1105 has been pressed. If the control unit 201 determines that the "Power-off" button 1105 has been pressed, the process proceeds to step S808. If not, the processing of this step is repeated.

In step S808, the control unit 201 transmits a power-off instruction to the digital camera 100. After receiving this instruction, the digital camera 100 is powered off. The above is the description of the case where it is determined in step S804 that the easy connection mode notification has been received.

Modification

Figure 9:
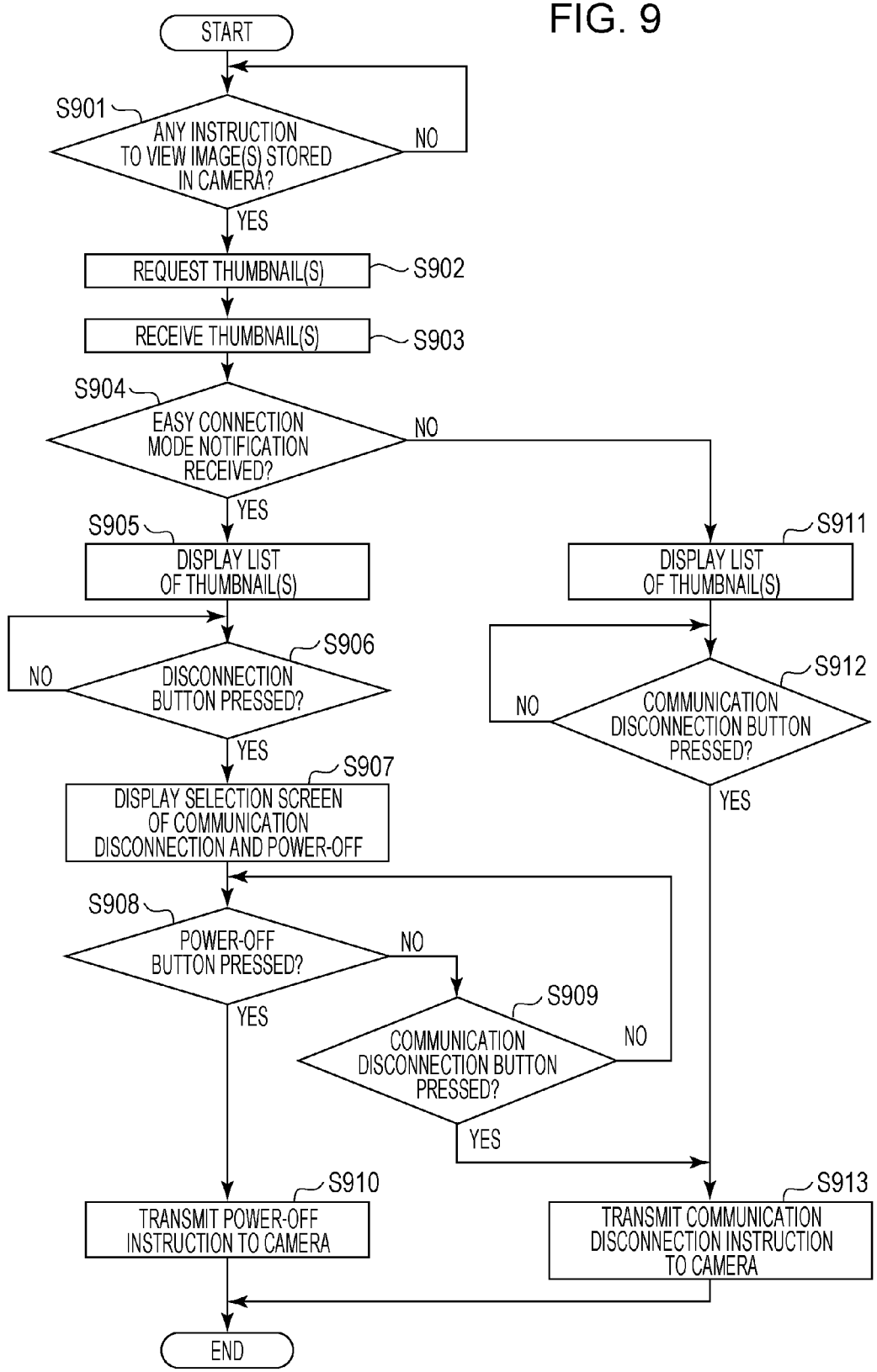
FIG. 9 is a flowchart illustrating a process performed based on the camera communication application of the mobile phone after a connection has been established in the first embodiment.

As a modification of the process illustrated in FIG. 8, a process illustrated in a flowchart of FIG. 9 may be performed if it is determined that the easy connection mode notification has been received. This will be described below.

Because FIGS. 8 and 9 have many common steps, a description of the common steps is omitted and steps unique to FIG. 9 will be mainly described in the description of the flowchart of FIG. 9.

Processing of steps S901 to S903 and S911 and S912 is similar to that performed in steps S801 to S803 and S809 and S810 illustrated in FIG. 8, respectively, and thus a description thereof will be omitted.

In step S904, the control unit 201 determines whether the easy connection mode notification has been received from the digital camera 100. If the control unit 201 determines that the easy connection mode notification has been received, the process proceeds to step S905. If not, the process proceeds to step S911.

A description will be given of the case where the control unit 201 determines in step S904 that the easy connection mode notification has been received. In this case, the process proceeds to step S905.

In step S905, the control unit 201 displays a list of the received thumbnails and the "Disconnect" button 1104 on the display unit 206. FIG. 11B illustrates an example of the displayed screen.

In step S906, the control unit 201 determines whether the "Disconnect" button 1104 has been pressed. If the control unit 201 determines that the "Disconnect" button 1104 has been pressed, the process proceeds to step S907. If not, the processing of this step is repeated.

Figure 11D:
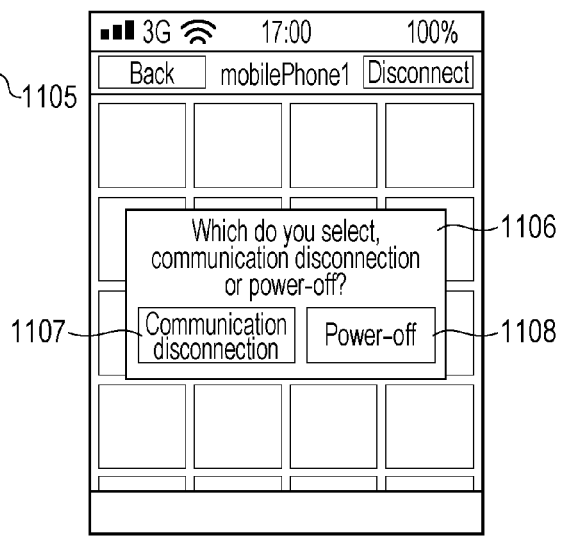

In step S907, the control unit 201 displays, on the display unit 206, a selection screen 1106 (FIG. 11D), which includes a "Communication disconnection" button 1107 used to input an instruction to disconnect communication with the digital camera 100 and a "Power-off" button 1108 used to input an instruction to power off the digital camera 100 and on which the user selects the "Communication disconnection" button 1107 or the "Power-off" button 1108.

In step S908, the control unit 201 determines whether the "Power-off" button 1108 has been pressed. If the control unit 201 determines that the "Power-off" button 1108 has been pressed, the process proceeds to step S910. If not, the process proceeds to step S909.

First, a description will be given of the case where it is determined in step S908 that the "Power-off" button 1108 has been pressed. In this case, the process proceeds to step S910.

In step S910, the control unit 201 transmits a power-off instruction to the digital camera 100.

Next, a description will be given of the case where it is determined in step S908 that the "Power-off" button 1108 has not been pressed. In this case, the process proceeds to step S909.

In step S909, the control unit 201 determines whether the "Communication disconnection" button 1107 has been pressed. If it is determined that the "Communication disconnection" button 1107 has been pressed, the process proceeds to step S913. If not, the process returns to step S908.

In step S913, the control unit 201 transmits a communication disconnection instruction to the digital camera 100.

The above is the operation of the process of the camera communication application performed after the mobile phone 200 is connected to the digital camera 100 in the first embodiment.

Figure 10:
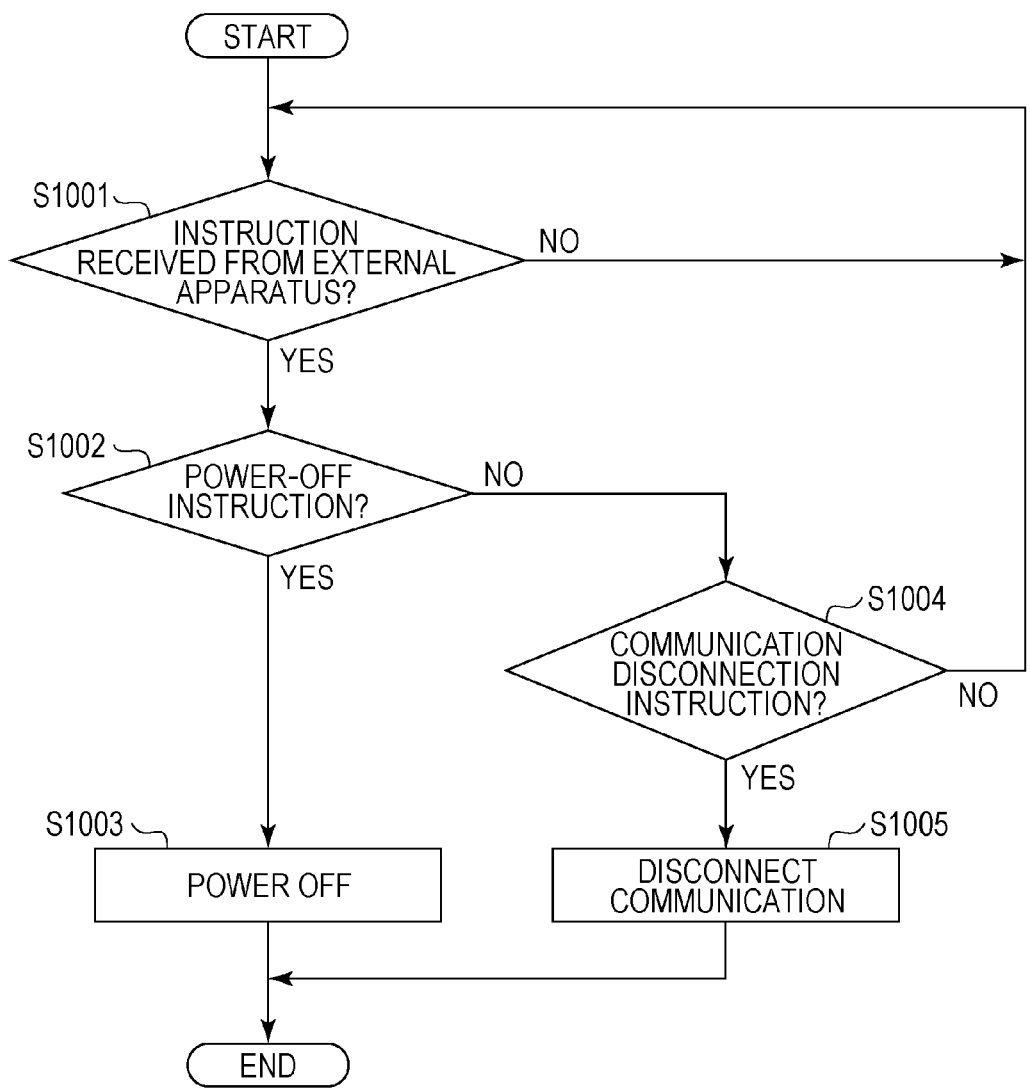
FIG. 10 is a flowchart illustrating a process performed by the digital camera after a connection has been established in the first embodiment.

FIG. 10 is a flowchart illustrating a process performed by the digital camera 100 after a connection has been established in the first embodiment.

In step S1001, the control unit 101 determines whether an instruction has been received from the mobile phone 200. If it is determined that an instruction has been received, the process proceeds to step S1002. If not, the processing of this step is repeated.

In step S1002, the control unit 101 determines whether the received instruction is the power-off instruction. If it is determined that the received instruction is the power-off instruction, the process proceeds to step S1003. If not, the process proceeds to step S1004.

First, a description will be given of the case where it is determined in step S1002 that the received instruction is the power-off instruction. In this case, the process proceeds to step S1003.

In step S1003, in accordance with the power-off instruction received from the mobile phone 200, the control unit 101 performs processing of powering off the digital camera 100.

Next, a description will be given of the case where it is determined in step S1002 that the received instruction is not the power-off instruction. In this case, the process proceeds to step S1004.

In step S1004, the control unit 201 determines whether the received instruction is the communication disconnection instruction. If it is determined that the received instruction is the communication disconnection instruction, the process proceeds to step S1005. If not, the process returns to step S1001.

In step S1005, in accordance with the communication disconnection instruction received from the mobile phone 200, the control unit 101 disconnects communication of the digital camera 100.

In addition to the cases described above, in the case where the display unit 106 of the digital camera 100 is turned off during communication or in the case where the remaining battery level of the digital camera 100 becomes low, the "Power-off" button 1108 may be displayed on the display unit 206 of the mobile phone 200. In this case, the digital camera 100 notifies the mobile phone 200 of turning off of the display unit 106 or the low battery state when the display unit 106 of the digital camera 100 is turned off or the remaining battery level becomes lower than or equal to a threshold. In response to this notification, the mobile phone 200 displays the "Power-off" button 1108.

Also, if the mobile phone 200 determines that a communication rate between the mobile phone 200 and the digital camera 100 has dropped, the "Power-off" button 1108 may be displayed on the display unit 206 of the mobile phone 200.

The above is the operation indicating the process performed by the digital camera 100 after a connection has been established in the first embodiment.

In the first embodiment, in the case where a connection is established in the easy connection mode, the digital camera 100 is configured to be powered off from the mobile phone 200. By changing the allowed operation in accordance with the connection mode, control suitable for the connection mode may be performed.

Second Embodiment

In the first embodiment described above, the example has been described in which the digital camera 100 is controlled using the mobile phone 200. In contrast, in the second embodiment, a configuration will be described in which the digital camera 100 automatically decides control regarding disconnection of communication and power-off in accordance with the connection mode.

The mobile phone 200 according to the second embodiment does not provide the two buttons, i.e., the "Disconnect" button and the "Power-off" button, unlike the first embodiment. The mobile phone 200 according to the second embodiment is configured to display one button (a disconnect button in the second embodiment). Note that the first and second embodiments have many common configurations, and thus configurations unique to the second embodiment will be mainly described.

Figure 12:
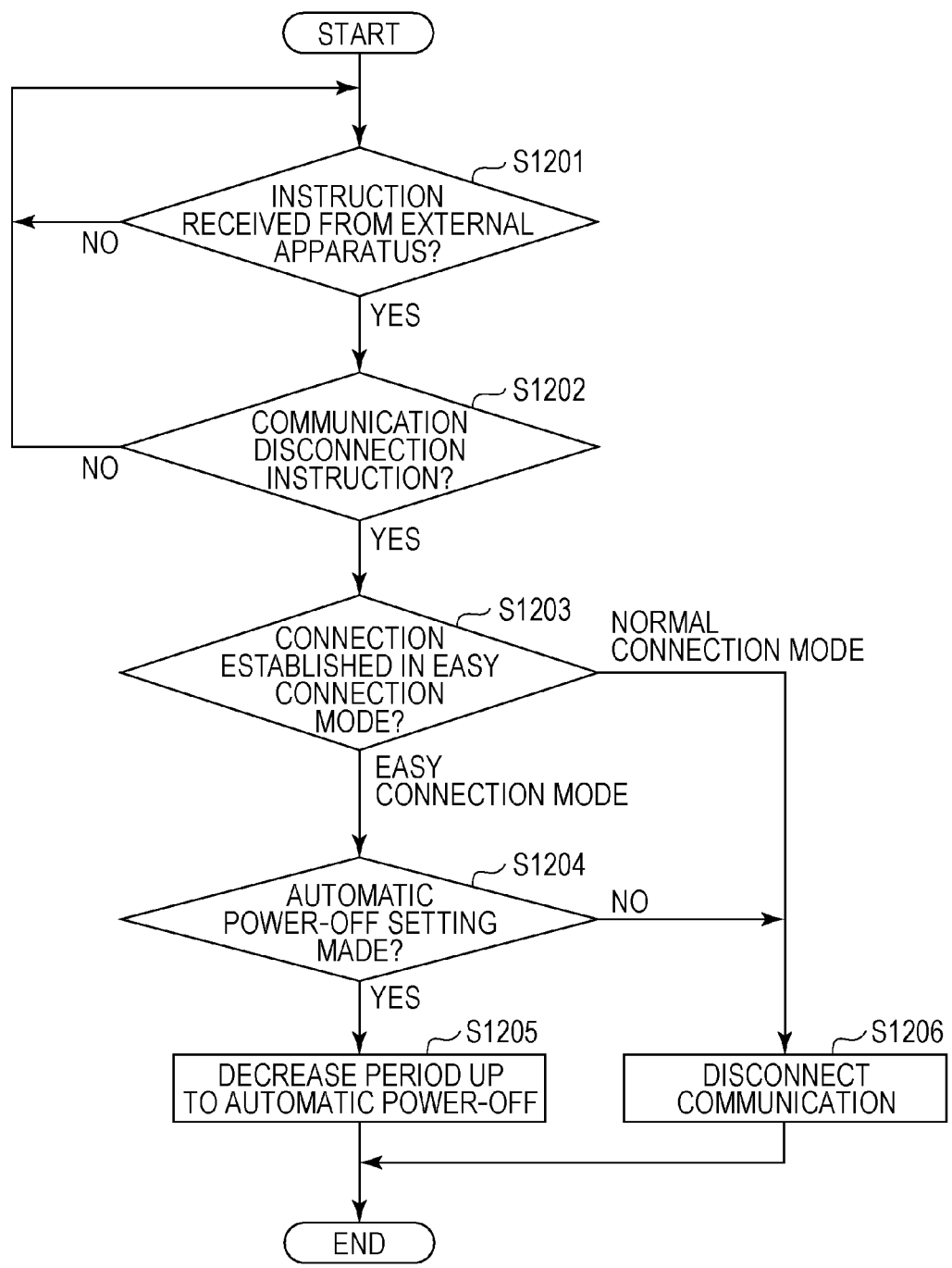
FIG. 12 is a flowchart illustrating an operation performed by the digital camera after a connection has been established in a second embodiment.

FIG. 12 is a flowchart illustrating an operation performed by the digital camera 100 after a connection to the mobile phone 200 has been established. Step S1201 is similar to step S1001 of FIG. 10, and thus a description thereof will be omitted.

In step S1202, the control unit 101 determines whether an instruction received from the mobile phone 200 is a disconnection instruction. If it is determined that the received instruction is the disconnection instruction, the process proceeds to step S1203. If not, the process returns to step S1201.

In step S1203, the control unit 101 determines whether a connection between the digital camera 100 and the mobile phone 200 has been established in the easy connection mode. If it is determined that the connection has been established in the easy connection mode, the process proceeds to step S1204. If not (if the connection has been established in the normal connection mode), the process proceeds to step S1206.

In step S1204, the control unit 101 determines whether an automatic power-off setting of the digital camera 100 is enabled. If it is determined that the automatic power-off setting is enabled, the process proceeds to step S1205. If not, the process proceeds to step S1206.

In step S1205, the control unit 101 decreases a period up to automatic power-off set in the digital camera 100.

In step S1206, the digital camera 100 is disconnected from the mobile phone 200.

The above is the process according to the second embodiment. In the first embodiment, the power-off button is displayed on the display unit 206 of the mobile phone 200 if it is determined that a connection between the mobile phone 200 and the digital camera 100 has been established in the easy connection mode. In contrast, in the second embodiment, if it is determined in step S1203 that a connection between the digital camera 100 and the mobile phone 200 has been established in the easy connection mode, the operation to be performed may be changed in the digital camera 100 instead of changing control performed in the mobile phone 200.

The above is the operation performed after a connection between the digital camera 100 and the mobile phone 200 has been established in the second embodiment. By performing processing in the above-described manner, mechanisms for communication disconnection and power-off may be automatically switched between in the digital camera 100 without requiring the mobile phone 200 to be aware of the connection mode.

While the present disclosure has been described in detail above based on the embodiments thereof, these embodiments are not seen to be limiting. Various configurations that do not depart from the intent of these embodiments are applicable. The above-described embodiments may be appropriately combined with each other partially.

According to the embodiments, control corresponding to a mode used to establish a connection to an external apparatus may be implemented.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-286679, filed Dec. 28, 2012, which is hereby incorporated by reference herein in its entirety.

What is claimed is:

1. An image processing apparatus connectable to an external apparatus, the image processing apparatus comprising:
    a recording control unit configured to perform control so that image data is recorded on a recording medium;
    a transmission unit configured to transmit image data selected by an operation on an operation unit of the image processing apparatus to the external apparatus in a first connection mode and transmit image data selected by an operation on an operation unit of the external apparatus to the external apparatus in a second connection mode; and
    a control unit configured to, in a case where a user operation to terminate a wireless connection to the external apparatus started in the first connection mode is inputted in the external apparatus, perform control so that the connection to the external apparatus is terminated and the image processing apparatus is not turned off, and in a case where a user operation to terminate a wireless connection to the external apparatus started in the second connection mode is inputted in the external apparatus, perform control so that the image processing apparatus is turned off.

2. The image processing apparatus according to claim 1, wherein the control unit is configured to perform control so that the wireless connection to the external apparatus is terminated in response to reception of a notification transmitted from the external apparatus based on receiving the operation to terminate a wireless connection to the external apparatus started in the first connection mode by the external apparatus, and wherein the control unit is configured to perform control so that the image processing apparatus is turned off in response to reception of a notification transmitted from the external apparatus based on receiving the operation to terminate a wireless connection to the external apparatus started in the second connection mode by the external apparatus.

3. The image processing apparatus according to claim 1, further comprising a generation unit configured to generate a wireless network by transmitting a beacon at regular intervals, wherein the wireless connection to the external apparatus is a wireless connection via the wireless network.

4. The image processing apparatus according to claim 3, further comprising a hardware button configured to generate a wireless network, wherein the generation unit is configured to generate the wireless network by an operation of the hardware button.

5. The image processing apparatus according to claim 3, wherein the image processing apparatus has a function to display a menu on a display, and wherein the generation unit is configured to start to generate the wireless network by an operation on the menu to be displayed.

6. The image processing apparatus according to claim 1, wherein in a case where a wireless connection to the external apparatus is started in the second connection mode, a thumbnail of the image data recorded on the recording medium is transmitted to the external apparatus to perform control so that image data to be transmitted from the image processing apparatus to the external apparatus is selectable by an operation on the operation unit of the external apparatus.

7. The image processing apparatus according to one of claim 1, wherein in a case where a wireless connection to the external apparatus is started in the first connection mode, the image data recorded on the recording medium is displayed on the display of the image processing apparatus to perform control so that image data to be transmitted from the image processing apparatus to the external apparatus is selectable by an operation on the operation unit of the image processing apparatus.

8. The image processing apparatus according to claim 1, further comprising an image capturing unit configured to capture an image of an object and generate image data, wherein the image data generated by the image capturing unit is recorded on the recording medium.

9. A control method of controlling an image processing apparatus connectable to an external apparatus, the control method comprising:

a recording control step of performing control so that image data is recorded on a recording medium;

a transmission step of transmitting image data selected by an operation on an operation unit of the image processing apparatus to the external apparatus in a first connection mode and transmit image data selected by an operation on an operation unit of the external apparatus to the external apparatus in a second connection mode; and a control step of, in a case where a user operation to terminate a wireless connection to the external apparatus started in the first connection mode is inputted in the external apparatus, performing control so that the connection to the external apparatus is terminated and the image processing apparatus is not turned off, and in a case where a user operation to terminate a wireless connection to the external apparatus started in the second connection mode is inputted in the external apparatus, performing control so that the image processing apparatus is turned off.

10. A non-transitory computer-readable storage medium storing computer executable instructions for causing a computer to execute a control method comprising:

a recording control step of performing control so that image data is recorded on a recording medium;

a transmission step of transmitting image data selected by an operation on an operation unit of the image processing apparatus to the external apparatus in a first connection mode and transmit image data selected by an operation on an operation unit of the external apparatus to the external apparatus in a second connection mode; and a control step of, in a case where a user operation to terminate a wireless connection to the external apparatus started in the first connection mode is inputted in the external apparatus, performing control so that the connection to the external apparatus is terminated and the image processing apparatus is not turned off, and in a case where a user operation to terminate a wireless connection to the external apparatus started in the second connection mode is inputted in the external apparatus, performing control so that the image processing apparatus is turned off.

11. A communication apparatus comprising:

a connection unit configured to wirelessly connect the communication apparatus to an external apparatus in one of a plurality of connection modes including a first connection mode and a second connection mode, connection procedures in the first connection mode being different from connection procedures in the second connection mode; and a control unit configured to, in a case where the communication apparatus is connected to the external apparatus in the first connection mode, perform control so that the external apparatus is not turned off by an instruction from the communication apparatus, and in a case where the communication apparatus is connected to the external apparatus in the second connection mode, perform control so that the external apparatus is turned off by an instruction from the communication apparatus.

12. The communication apparatus according to claim 11, wherein an amount of a user's operation that is necessary until a connection of the communication apparatus to the external apparatus is established is smaller in the second mode than in the first connection mode.

13. The communication apparatus according to claim 11, wherein a selection of either connection using a predetermined communication parameter or connection using another communication parameter is received in a case where the communication apparatus is connected to the external apparatus in the first connection mode, and wherein the communication apparatus is connected to the external apparatus using the predetermined communication parameter in a case where the communication apparatus is connected to the external apparatus in the second connection mode.

14. The communication apparatus according to claim 11, wherein the second connection mode is a mode for connecting the communication apparatus to a predetermined external apparatus, and wherein the first connection mode is a mode for connecting the communication apparatus to one of a plurality of external apparatuses including an external apparatus other than the predetermined external apparatus.

15. The communication apparatus according to claim 11, wherein the connection unit is configured to connect the communication apparatus to the external apparatus n a connection mode selected by an operation on the external apparatus.

16. The communication apparatus according to claim 11, further comprising a determination unit configured to determine a connection mode in which the connection unit connects the communication apparatus to the external apparatus based on information received from the external apparatus via the connection unit,
wherein the control unit is configured to perform control so that the external apparatus is not turned off by the instruction from the communication apparatus in a case where the determination unit determines that the connection mode is the first connection mode, and to perform control so that the external apparatus is turned off by the instruction from the communication apparatus in a case where the determination unit determines that the connection mode is the second connection mode.

17. The communication apparatus according to claim 11, wherein the control unit is configured to perform control to display an operation unit for turning off the external apparatus on a display unit so that the external apparatus is turned off by the instruction from the communication apparatus, and to perform control not to display the operation unit for turning off the external apparatus on the display unit so that the external apparatus is not turned off by the instruction from the communication apparatus.

18. The communication apparatus according to claim 11, further comprising:
a request unit configured to request image data from an external apparatus to which the communication apparatus is connected in either the first connection mode or the second connection mode; and
a display control unit configured to perform control so that the image data transmitted from the external apparatus in response to the request is displayed on the display unit.

19. The communication apparatus according to claim 18, wherein the external apparatus includes an image capturing unit configured to generate image data, and
wherein the display control unit is configured to perform control so that the image data transmitted from the external apparatus in response to the request and generated by the image capturing unit is displayed on the display unit.

20. The communication apparatus according to claim 11, further comprising a reception unit configured to receive a selection of a control mode to be executed from a plurality of control modes for controlling the external apparatus to which the communication apparatus is connected.

21. The communication apparatus according to claim 11, further comprising a public network connection unit configured to connect the communication apparatus to a public network.

22. A control method of a communication apparatus, the control method comprising:
a connection step of wirelessly connecting the communication apparatus to an external apparatus in one of a plurality of connection modes including a first connection mode and a second connection mode, connection procedures in the first connection mode being different from connection procedures in the second connection mode; and
a control step of, in a case where the communication apparatus is connected to the external apparatus in the first connection mode, performing control so that the external apparatus is not turned off by an instruction from the communication apparatus, and in a case where the communication apparatus is connected to the external apparatus in the second connection mode, performing control so that the external apparatus is turned off by an instruction from the communication apparatus.

23. A non-transitory computer-readable storage medium storing computer executable instructions for causing a computer to execute a control method comprising:
a connection step of wirelessly connecting the communication apparatus to an external apparatus in one of a plurality of connection modes including a first connection mode and a second connection mode, connection procedures in the first connection mode being different from connection procedures in the second connection mode; and
a control step of, in a case where the communication apparatus is connected to the external apparatus in the first connection mode, performing control so that the external apparatus is not turned off by an instruction from the communication apparatus, and in a case where the communication apparatus is connected to the external apparatus in the second connection mode, performing control so that the external apparatus is turned off by an instruction from the communication apparatus.

* * * * *